United States Patent [19]

Green

[11] Patent Number: 5,236,397
[45] Date of Patent: Aug. 17, 1993

[54] BELT TENSION ADJUSTMENT MECHANISM

[75] Inventor: Douglas F. Green, Brisbane, Australia

[73] Assignee: Rover Mowers Limited, Brisbane, Australia

[21] Appl. No.: 695,347

[22] Filed: May 3, 1991

[30] Foreign Application Priority Data

May 4, 1990 [AU] Australia .................. PJ9958

[51] Int. Cl.⁵ .................................. F16H 7/22
[52] U.S. Cl. .................. 474/105; 474/108; 474/134
[58] Field of Search .................. 474/105–108, 474/101, 117, 134, 135

[56] References Cited

U.S. PATENT DOCUMENTS

| 2,576,582 | 11/1951 | Elliott | 474/134 X |
| 2,997,890 | 8/1961 | Burrows et al. | 474/117 |
| 3,110,190 | 11/1963 | Belting et al. | 474/117 |
| 3,374,686 | 3/1968 | Brewer | 474/135 |
| 3,391,807 | 7/1968 | Buschbom | 474/134 X |
| 3,722,306 | 3/1973 | Campbell et al. | 474/135 X |
| 4,454,236 | 6/1984 | Foster et al. | 474/135 |
| 4,883,445 | 11/1989 | Gomoll et al. | 474/117 X |

Primary Examiner—Ramon S. Britts
Assistant Examiner—Roger J. Schoeppel
Attorney, Agent, or Firm—Fisher, Christen & Sabol

[57] ABSTRACT

A belt tension adjustment mechanism having a pivoting pulley support plate adapted to cooperate with a pivoting ratchet plate. The pulley support plate directly or indirectly anchors a belt to be tensioned. A tension spring is associated with the ratchet plate to bias the ratchet plate towards a position of increased belt tension. The ratchet plate includes a teeth and pawl arrangement for preventing the ratchet plate from spontaneous rotation to a position of reduced belt tension.

13 Claims, 2 Drawing Sheets

– 1 –

BELT TENSION ADJUSTMENT MECHANISM

BACKGROUND OF THE INVENTION

1. Field of the Invention

The present invention relates to belt tensioning mechanisms and more particularly, though not exclusively relates to a belt tensioning mechanism for tensioning drive belts used in plant and motor vehicles.

Although the present invention can be adapted for use with a great variety of drive belt applications, the invention will primarily be described in its application as a belt tensioning mechanism for belts associated with ride on lawn mowers.

2. Related Art

The use of V-belts in association with pulleys is a well known means of transferring motion and more particularly drive from a central drive or energy source throughout the systems in motor vehicles.

One disadvantage of using driven belts is that they tend to stretch under constant tensile forces resulting in a slackening of the belt.

In lawn mowers and particularly ride on lawn mowers, engine horse power must be transmitted to the drive wheels and to the cutter assembly however, in operation it is quite common for V-belts to undergo stretching thereby reducing their efficiency in operation. If the belt slackens the belt can undergo excessive wear due to slippage and in extreme cases it can fall off the pulley.

This is a well known problem in the use of V-belts and there have been many attempts to provide various means and mechanisms in order to provide compensating belt tension adjustment in order to achieve the required tension in the belt so that operational efficiency can be maintained at an optimum level. Drive belts require constant monitoring with means available to readily and efficiently adjust belt tension.

Known belt tensioning adjustment mechanisms can be cumbersome and difficult to operate and are designed such that the range of tension available is relatively limited and sometimes less than the degree to which a particular belt may have stretched. This necessitates early belt replacement thus shortening the life of the belt not so much due to wear but due to the limited range of tensioning available.

SUMMARY OF THE INVENTION

The present invention seeks to provide a belt tensioning mechanism whereby the tension of a belt used for a belt drive of almost any type in a powered vehicle is automatically tensioned over a considerable range of adjustment or can be selectively adjusted by manual operation of the mechanism.

In one broad form the present invention comprises a belt tension adjustment mechanism comprising;

a pivoting pulley support plate adapted to cooperate with a pivoting ratchet plate, means on said pulley support plate to directly or indirectly anchor a belt to be tensioned, a tension spring associated with said ratchet plate which biases the ratchet plate towards a position of increased belt tension, means associated with the ratchet plate preventing the ratchet plate from spontaneous rotation to a position of reduced belt tension.

In its broadest form the present invention comprises;
In the preferred embodiment the first and second members are planar plates and co-operate by mechanical interengagement to maintain belt tension or enable adjustment thereto. In another broad form the present invention comprises;

a belt tensioning mechanism according to claim 1 wherein the first and second members co-operate to allow selective arrangement of said belt or belts at a pre-selected condition of belt tension.

In the preferred embodiment the pulley is mounted on the pivoting pulley support plate, preferably by means of a through bolt. The pivoting pulley support plate is adapted to move about a pivot which provides free arcuate movement. Also, in the preferred embodiment the ratchet plate is adapted with an engaging pin which engages slots formed in the pivoting pulley support plate so that the ratchet plate and pivoting pulley support plate rotate towards each other in mutual cooperation with the ratchet plate being urged towards the position of mutual cooperation by means of a tension spring.

In another broad form the present invention comprises:

A belt tensioning adjustment mechanism comprising a pivotally adjustable first plate having directly or indirectly connected therewith a V-belt to be tensioned, a second plate adapted with means to mutually cooperate with said first plate and to pivot about a fulcrum such that the second plate urges the first plate towards a position of increased belt tension under the assistance of a tension spring. Means on the second plate to prevent rotation of said second plate away from said first plate and to a position of lower belt tension.

BRIEF DESCRIPTION OF THE DRAWINGS

The present invention will now be described in more detail according to a preferred but non limiting embodiment and with reference to the accompanying illustrations wherein:

Referring to FIG. 1 there is shown a belt tensioning adjustment mechanism 1 for tensioning a V-belt 2 preferably adapted to suit a ride on lawn mower.

Figure 1:
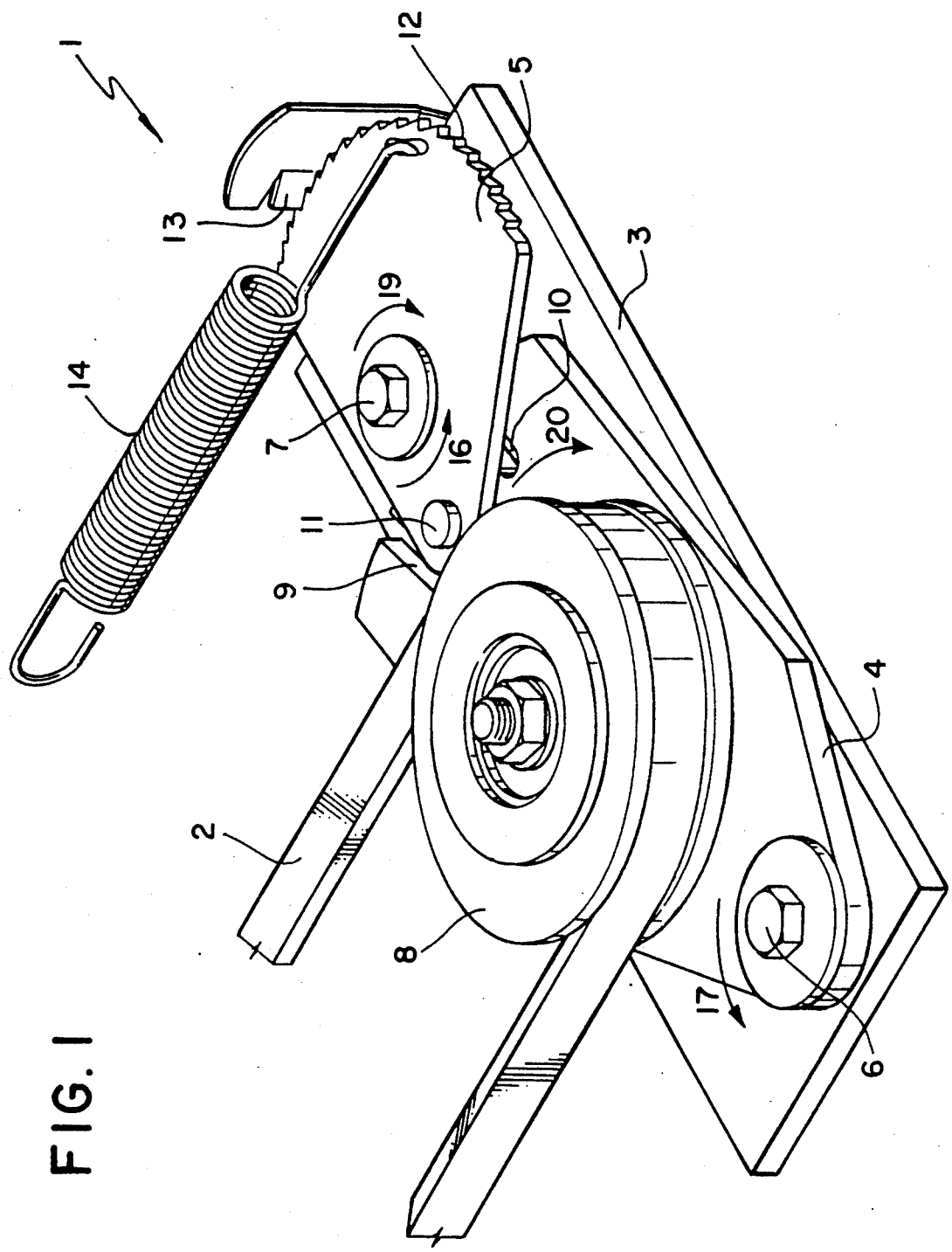
FIG. 1 shows an isometric view of the V-belt tensioning adjustment mechanism according to a preferred embodiment of the present invention.
Figure 2:
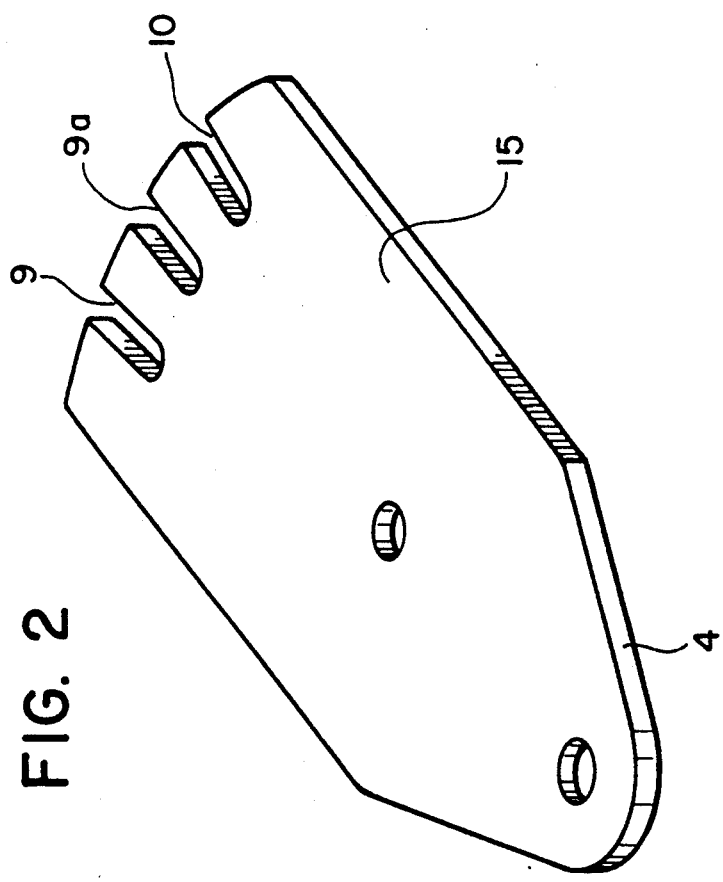
FIG. 2 is a perspective view showing the second member (15) in further detail.

According to the preferred embodiment, the mechanism comprises a mounting base plate 3 which can either be a separate plate or a portion of a motor vehicle body. Mounted on the mounting base 3 in different horizontal planes, are a pivoting pulley support plate 4 and a ratchet plate 5. The pivoting pulley support plate 4 is anchored to the mounting base 3 by means of pivot pin 6. Ratchet plate 5 is mounted to the mounting base 3 by means of ratchet pivot fulcrum pin 7 thereby enabling the ratchet plate 5 to selectively pivot about said pivot 7. The V-belt 2 is indirectly mounted on the pivoting pulley support plate 4 via pulley 8. Pivoting pulley support plate 4 also has adapted therein at least three slots 9, 9a and 10 which provide selective manual adjustment according to the degree of tension required to be achieved by the mechanism 1. The device can also operate effectively with one slot only.

The ratchet plate 5 is adapted with an engaging pin 11 which is adapted to enter either one of slots 9, 9a or 10 on the first plate according to tension requirements. It should be noted that the first plate may be adapted with numerous slots depending upon the degree and extent of adjustment required. The ratchet plate 5 is also adapted with a teeth array 12 which engages with the pawl 13. Pawl 13 is connected to ratchet plate 21. Ratchet plate 5 also has adapted thereto a biasing tension spring 14 which is connected at the other end to a point on the vehicle with which the mechanism is to be used.

The tension mechanism 1 has primarily two modes of operation those being automatic and manual.

The mechanism once it has been set and under the action of the tension spring 14 continually provides an automatic compensating adjustment to maintain consistent V-belt tension in the event of belt stretching during operation. When the new tension position is created by the spring, the pawl 13 holds the new ratchet plate position to maintain the tension until more automatic adjustment is required.

FIG. 1 shows the V-belt adjustment mechanism in one position. When the belt is to be tensioned, it is necessary for the pivoting pulley support plate 4 to be rotated in the direction of arrow 20 thereby creating tension in V-belt 2. In order to achieve this result manually, pivot 6 is of sufficient looseness to enable rotational adjustment of the plate 4 in the direction of arrow 17. The natural tension on the belt if any, has a tendency to move the pivoting pulley support plate 4 in a direction of arrow 17 thereby reducing tension on the V-belt. In order to overcome this tendency, the tension spring 14 urges the ratchet plate 5 in the direction of arrow 16 thereby counter balancing the tendency of plate 4 to move in the direction of arrow 17 about pivot pin 6 under any residual belt tension.

The pivoting pulley support plate can be shifted manually, if necessary in the direction opposite to that of arrow 17 to the required position commensurate with the amount of tensioning required in the V-belt and also dependent upon which of slots 9, 9a and 10 are selected for the adjustment.

In addition, the tension spring 14 urges the ratchet plate 5 in the direction of arrow 16 and this causes the teeth of teeth array 12 to move along the pawl 13 preventing the ratchet plate 5 from moving in a direction opposite to arrow 16 i.e. in the direction of arrow 19 over a direction any greater than the width of 1 tooth on the teeth array 12 in response to belt tension. The interengagement between the ratchet plate 5 and the pawl 13 prevents V-belt tension being lost once the new position and required degree of tension has been selected.

For ease of setting the adjustment the tension spring can be completely released and manual tension can be placed on the V-belt to effect setting.

When the V-belt tension is to be reduced if necessary, the opposite procedure is adopted whereby the pawl 13 is released from the teeth array 12 thereby enabling plate 4 to move in the direction of arrow 17 and plate 5 to move in the direction of arrow 19.

One advantage of the present invention lies in the facility for the spring 14 to automatically take up belt tension if necessary, and the optional facility not to include the spring in the mechanism with the result that the mechanism may be manually set to a position of predetermined spring tension.

It will be recognised by persons skilled in the art that numerous variations and modifications can be made to the present invention without departing from the overall spirit and scope of the invention as broadly described herein. Those variations would include use of the mechanisms in any drive having a drive transfer member which required tensioning automatically or manually.

I claim:

1. A drive belt tensioning mechanism for maintaining and/or adjusting drive belt tension, said mechanism comprising;
   a first member adapted to pivot about a first anchorage and in co-operation with a second member,
   said second member adapted to pivot about a second anchorage,
   at least one pulley mounted on said second member about each of which a belt or belts to be tensioned travel/s,
   means on said first member to bias, in co-operative engagement with said second member, said pulley or pulleys such that the belt or belts are urged towards a condition of increasing tension, or to a condition such that a constant tension is maintained,
   means on said first member preventing said first member from advancing against said bias thereby preventing a condition of reduced tension of said belt or belts;
   wherein said first and second members co-operate to allow selective arrangement of said belt or belts at least one pre-selected condition of belt tension;
   wherein said first member rotates in conjunction with a first pivot pin, said pivot pin providing said first anchorage;
   wherein said first member has a profiled part at another edge adapted to engage a complementary profiled part of said second member;
   wherein said first member has a tooth array along one edge or part of an edge, said teeth being selectively engagable with a pawl to prevent rotation of said first member against said bias;
   wherein said first member is adapted to engage one end of a spring which creates said bias with the other end of said spring engaging a third anchorage; and wherein said first and second members co-operate by means of selective interengagement between slots forming said profiled part in said second member in said first plate and a said selector pin on said first member forming said complementary profiled part.

2. A belt tensioning mechanism according to claim 1 wherein slots form said profiled part on said second plate and a selector pin forms said complementary profile part on said first plate.

3. A belt tensioning mechanism according to claim 1 wherein the said pulley or pulleys about which said belt/s travel/s are mounted on said second member intermediate said first anchorage and said slots.

4. A belt tensioning mechanism according to claim 3 wherein, said selector pin engages one of said slots according to the required degree of travel of said second member to effect belt tension.

5. A belt tensioning mechanism according to claim 4 wherein the said slots are positioned on said second member so that increased travel of said member can be achieved to increase belt tension according to slot selection.

6. A belt tensioning mechanism according to claim 5 wherein the first and second member are mounted on a support platform.

7. A belt tensioning mechanism according to claim 6 wherein said first and second pivot pins anchor said first and second members in said support platform and wherein said first pivot pin is located centrally on our near one edge of said first member.

8. A belt tensioning mechanism according to claim 7 wherein the said pawl is located on a restraining member adjacent said teeth array.

9. A belt tensioning mechanism according to claim 8 wherein the tooth array and pawl combine to form a ratchet assembly.

10. A belt tensioning mechanism according to claim 9 wherein the said second member is a curvilinear plate.

11. A belt tensioning mechanism according to claim 10 wherein the mechanism is fitted in a ride-on lawn mower.

12. A belt tensioning mechanism according to claim 9 wherein said first and second members are substantially planar plates.

13. A belt tensioning mechanism according to claim 1 wherein said second member includes a profiled part having three slots.

* * * * *